Sept. 23, 1941.  W. H. GRINDLE  2,256,591
SYSTEM FOR GENERATING GAS FROM LIQUEFIED GAS
Filed Oct. 20, 1939  2 Sheets-Sheet 1
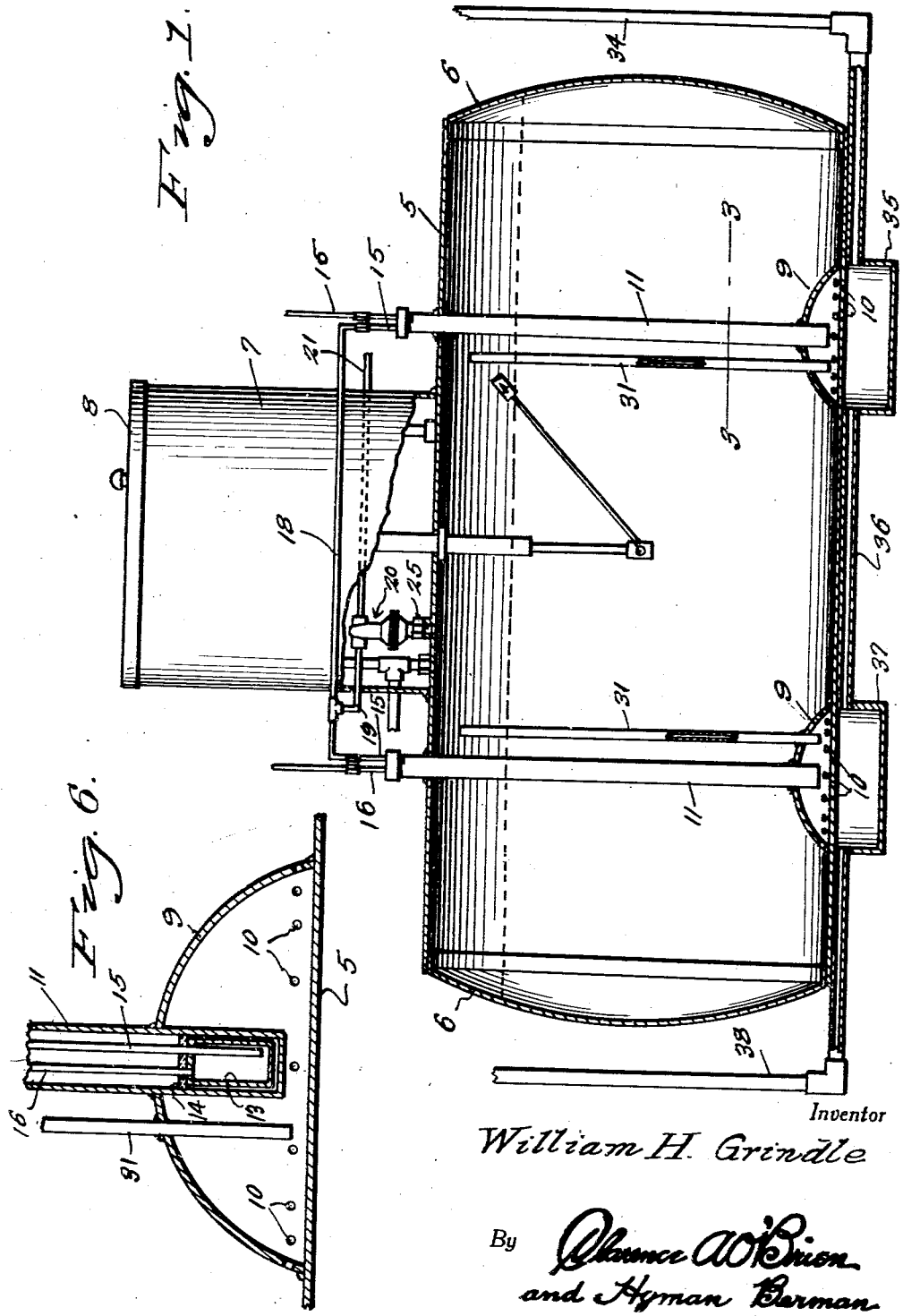
Inventor
William H. Grindle
By Clarence A. O'Brien
and Hyman Berman
Attorneys

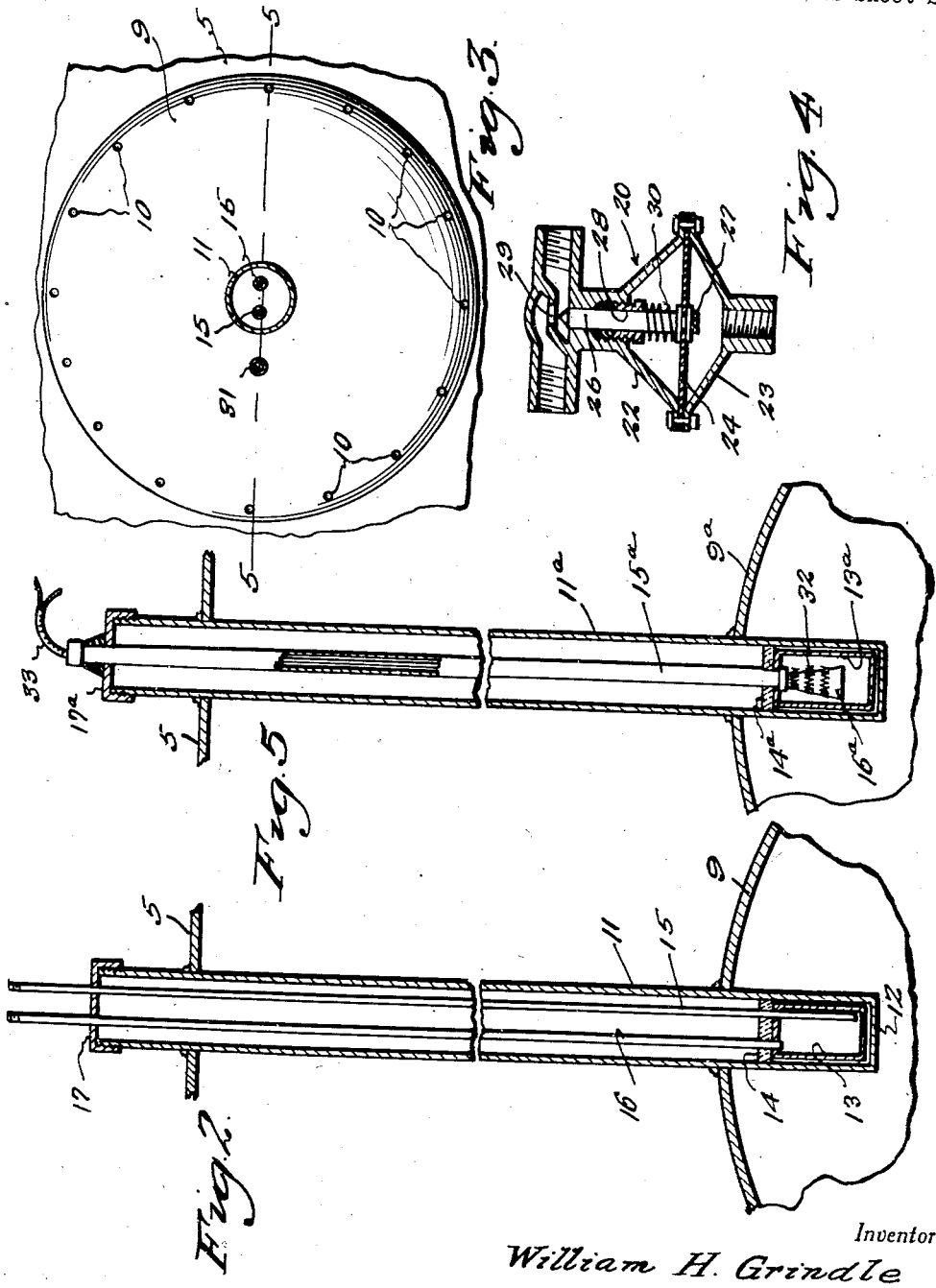

Patented Sept. 23, 1941

2,256,591

UNITED STATES PATENT OFFICE 2,256,591

SYSTEM FOR GENERATING GAS FROM LIQUEFIED GAS

William H. Grindle, Harlingen, Tex.

Application October 20, 1939, Serial No. 300,471

2 Claims. (Cl. 62—1)

This invention relates to new and useful improvements in a system for generating gas from liquefied gas, the principal object being to provide a plant improved to the extent of providing means for maintaining the pressure within the plant constantly regulated.

Another important object of the invention is to provide a gas generating plant in which liquid is used as the gas supplying agent and which liquid can be controlled as to temperature to determine the gasification and contemporary pressure in an automatic manner.

Other objects and advantages of the invention will become apparent to the reader of the following specification.

In the drawings:

Figure 1 represents a side elevational view of the plant with a portion in section disclosing the improved features.

Fig. 2 is a fragmentary detailed sectional view through one form of the invention.

Fig. 3 is a section on line 3—3 of Fig. 1.

Fig. 4 is a fragmentary detailed sectional view through the pressure controlled valve.

Fig. 5 is a fragmentary vertical sectional view through the electric heat unit.

Fig. 6 is a fragmentary vertical sectional view showing a heated fluid type of heating means.

Referring to the drawings wherein like numerals designate like parts, it can be seen in Fig. 1, that numeral 5 represents the usual tank having the end walls 6—6 and this tank can be mounted in a suitable way on a support (not shown), or buried underground.

Rising from the tank 5 is the case 7 having the cover 8 and in this case are certain features of a conventional system for generating gas from liquefied gas such as the automatic filler valve, the automatic vapor return valve, vapor trap, pressure regulator, etc., which features are not shown.

In carrying out the present invention, one or more domes 9 are secured upon the bottom of the tank 5 and have perforations 10 around the lower portions thereof so that butane or other gas producing substance in the tank 5 can readily pass into the dome.

Extending downwardly through the top of the tank 5 and through the top of each dome 9 to terminate within the dome is a barrel 11, the barrel 11 being closed at its lower end as at 12 and having a hermetically sealed box 13, preferably of a suitable heat conducting material disposed in the lower portion thereof.

A heat insulating partition 14 is disposed in each barrel 11 just above the box 13 and through the partition 14 and the top of the box 13 are disposed the vertically extending induction and educton pipes 15 and 16 respectively, which extend upwardly and through the cap 17 at the upper end of the barrel.

The induction pipes 15 are connected by the jumper pipe 18 from which extends the pipe section 19 to one side of the pressure controlled valve 20. The heated fluid supply pipe 21 extends to the other side of the valve 20. This valve 20 is of the diaphragm controlled type, the valve consisting of the shell having the upper section 22 and the lower section 23 between which is the diaphragm 24. A coupling unit 25 secures the lower portion of the valve 20 to the upper portion of the tank 5 and within the shell 7 and in communication with the interior of the tank 5.

A needle valve 26 has its lower end secured as at 27 to the intermediate portion of the diaphragm 24 and this valve is slidable through the packing gland 28, as adapted to be positioned away from the valve seat 29 under the influence of the spring 30. Pressure or lack of pressure in the tank 5 regulates the position of the needle valve 26 in the amount of heated fluid which passes from the supply line 21 into the pipes 15 within the barrels 11. Thus the amount of heat to which the gas producing medium in the tank is subjected is dependent upon the amount of pressure within the tank. Thus as the gas is used the resulting decrease in pressure will cause more rapid gasification within the tank.

Furthermore, the quality of the gas at all levels of the tank 5 is maintained by reason of the spewing tubes 31. These spewing tubes extend at their lower ends into the domes 9 and terminate at their upper ends just below the top of the tank. Thus the liquefied gas can rise from the heated points within the domes 9 upwardly through the tubes 31 and out through the top of the tubes to mix with the gas at the upper portion of the tank 5. Thus a circulation of the gases is maintained in the tank.

A modification of the heat producing means is shown in Fig. 5, wherein the tube 11a extends in the same manner through the top of the tank 5 and through the upper portion of the corresponding dome 9a.

A box 13a is provided in the lower portion of the barrel 11a. A tube 15a extends downwardly through the cap 17a at the upper end of the barrel 11a and passes downwardly through the heat insulating partition 14a and into the upper portion of the box 13a and provided with a formation 16a supporting the electric heating element 32. Wires extend to this heating element 32 through the tube 15a and from the cord 33 which extends from the top of the tube 15a. Thus the gas producing medium can be heated electrically and through the agency of a rheostat or switch means controlled by a pressure responsive device (not shown).

In the usual way the gas producing medium in the tank is gasified by the usual water supply which is usually of a higher temperature than the boiling point of the gas producing medium which is usually butane.

Numeral 34 represents the water supply line to the water box 35 under one dome 9 and from this water box 35 extends the connector pipe 36 to the other water box 37. Numeral 38 denotes the exhaust line from the last box 37.

While the foregoing specification sets forth the invention in specific terms, it is to be understood that numerous changes in the shape, size and materials may be resorted to without departing from the spirit and scope of the invention as claimed hereinafter.

Having thus described the invention, what is claimed as new is:

1. A system for generating gas from liquefied gas, a tank, a perforated dome in the tank at the bottom thereof, pressure controlled heated fluid heating means in the dome in heat exchange relation therewith, and a liquefied gas spewing tube rising from the dome and terminating near the top of the tank.

2. In a system for generating gas from liquefied gas, a tank, a perforated dome in the tank at the bottom thereof, a pressure controlled heated fluid heating means in the dome in heat exchange relation therewith and within the dome, and a liquefied gas spewing tube rising from the dome and terminating near the top of the tank.

WILLIAM H. GRINDLE.